United States Patent [19]

Forney

[11] 3,990,869

[45] *Nov. 9, 1976

[54] PROCESS FOR CONTROLLING POLLUTION AND CONTAMINATION IN PAINT OR LACQUER SPRAY BOOTHS

[75] Inventor: Steven W. Forney, Wixom, Mich.

[73] Assignee: Nalco Chemical Company, Oak Brook, Ill.

[ * ] Notice: The portion of the term of this patent subsequent to Jan. 21, 1992, has been disclaimed.

[22] Filed: Nov. 20, 1974

[21] Appl. No.: 525,409

Related U.S. Application Data

[63] Continuation-in-part of Ser. No. 411,679, Nov. 1, 1973, Pat. No. 3,861,887.

[52] U.S. Cl. .................................. 55/19; 55/85; 55/89
[51] Int. Cl.² .................................. B01D 47/00
[58] Field of Search .................. 55/19, 84–89, 55/220, 238, 240; 98/115 SB; 260/584 B

[56] References Cited
UNITED STATES PATENTS

| | | |
|---|---|---|
| 2,086,514 | 7/1937 | Saunders et al. .................. 55/85 X |
| 3,168,031 | 2/1965 | Wilhelmsson et al. .......... 98/115 SB |
| 3,173,879 | 3/1965 | Arnold et al. .................... 98/115 SB |
| 3,251,882 | 5/1966 | Kirckpatrick ....................... 260/584 |
| 3,468,818 | 9/1969 | Phillips .............................. 210/54 X |
| 3,795,093 | 3/1974 | Gerhard ............................ 55/240 X |
| 3,861,887 | 1/1975 | Forney ................................... 55/19 |

*Primary Examiner*—Charles N. Hart
*Assistant Examiner*—Richard W. Burks
*Attorney, Agent, or Firm*—Johnston, Keil, Thompson & Shurtleff

[57] ABSTRACT

Water used to wash the air in paint or lacquer spray booths in order to remove over-sprayed paint or lacquers is treated with a blend of a polycationic water dispersible polymer and a compound of an amphoteric metal to reduce the tackiness of paint and lacquer solids and thereby reduce the tendency of over-sprayed paints and lacquers to adhere to walls, ceilings and floors of said spray booths and also to condition the paint and lacquer solids removed with the water so that they can be separated and the water recycled for further use in washing the air in the spray booth.

10 Claims, No Drawings

PROCESS FOR CONTROLLING POLLUTION AND CONTAMINATION IN PAINT OR LACQUER SPRAY BOOTHS

This application is a continuation-in-part of U.S. application Ser. No. 411,679 filed Nov. 1, 1973 now U.S. Pat. No. 3,861,887.

BACKGROUND

In the application of paints and lacquers to automobile bodies and other types of articles it is customary to carry out such operations in enclosed spray booths and to introduce into such spray booths a curtain of water to wash the air and to remove over-sprayed paints or lacquer solids. The water containing suspended solids is filtered or otherwise treated to separate the solids so that the water can be recycled.

This process involves many problems. Thus, the paint and lacquer solids are normally tacky and tend to adhere to the walls, ceilings and floors of the spray booths which makes it necessary to shut down the operation from time to time in order to clean the spray booths. The deposits which are formed on the walls, ceilings and floors of the spray booths are also subject to the growth of anaerobic corrosive bacteria (e.g., desulfovibrio) which generates corrosive and highly objectionable hydrogen sulfide.

The paint and lacquer solids which are washed away and form suspensions in the water that is removed from the spray booths present a disposal problem. In order to avoid contamination of the environment it is customary to separate these solids from the water and to recirculate the water but these solids are difficult to separate by the usual method of filtration.

It is therefore desirable to control pollution and contamination in paint or lacquer spray booths so as to prevent, as much as possible, the deposition of paint and lacquer solids on walls, ceilings and floors and to condition the sludge which is removed with the water so that it can be readily filtered and the water which forms the filtrate can be returned for use in the process.

OBJECTS

One of the objects of the present invention is to provide a new and improved process for controlling pollution and contamination in paint or lacquer spray booths in which the water used to wash the air in the spray booth and to remove over-sprayed paints or lacquers is conditioned by one or more additives which reduce the tackiness of paint and lacquer solids and thereby reduce the tendency of such solids to adhere to walls, ceilings and floors of paint and lacquer spray booths making it possible to operate such booths over a longer period of time before cleaning them which also reduces maintenance costs.

Another object of the invention is to provide a process of the type described in which paint and lacquer solids suspended in the water which is used to wash the air in spray booths are so conditioned that they can be recovered by filtration and the filtrate recycled in the process.

Another object of the invention is to provide a process of the type described characterized by deposit-corrosion control, longer booth runs, less maintenance, a more consistent effluent, lower plant treatment costs, lower microbiological activity, and the production of a sludge from the paint and lacquer solids which is more readily dewatered by filtration or otherwise than has been the case in conventional commercial operations. Other objects will appear hereinafter.

BRIEF SUMMARY OF THE INVENTION

In accordance with the invention pollution and contamination in paint or lacquer spray booths in which water is used to wash the air in the spray booth and to remove over-sprayed paint or lacquer solids are controlled by adding to the water a blend of a polycationic water dispersible polymer and a compatible compound of an amphoteric metal, preferably while maintaining a pH of 5.5 to 7.0 for a water based paint and within the range of 7.5 to 10.5 for a non-aqueous paint, the quantity of said blend being sufficient to reduce the tackiness of paint and lacquer solids and to condition such solids so that they can be separated from the water, e.g., by filtration, so that the water can be returned for recycling in the process.

DETAILED DESCRIPTION OF THE INVENTION

In a process of the type described the conventional paint or lacquer spray booth is a closed room where the object to be painted or lacquered is sprayed with paint or lacquer and the air is washed with a curtain or spray of water so as to remove over-sprayed solids. These suspensions can be disposed of as waste materials but in order to avoid contamination of the environment, it is desirable to separate the solids and to reuse the water. Unfortunately, the paint or lacquer solids are quite tacky and despite air washing with water, they tend to build up in the form of deposits on the walls, ceilings and floors of the spray booths. In a typical operation a run might last for 2 weeks and at the end of that time the spray booth has to be emptied and cleaned. The cleaning might require 200 man hours. Furthermore, the sludge which is produced during the operation of the spray booth as a result of the combination of water with the paint or lacquer solids is usually very difficult to de-water by the customary filtration methods. In addition, the accumulation of the paint or lacquer deposits on the walls, ceilings and floors of the spray booths provides a suitable environment for anaerobic corrosive bacteria.

In the practice of the present invention it has been found that the addition of the blend of polycationic water dispersible polymer and compatible compound of an amphoteric metal to the water used in washing the air in the spray booth reduces the tackiness of paint and lacquer solids, thereby reducing the tendency of over-sprayed paints and lacquers to adhere to walls, ceilings and floors of the spray booths and at the same time conditions the solids so that they can be readily removed from the water after the suspension of solids in water has been removed from the spray booths.

The separation of the solids from the water can be effected by vacuum filtration or in any other suitable manner and the filtrate can then be used over again in the process.

The polycationic water dispersible polymer which is employed in the practice of the invention is a polyelectrolyte of a well known type having a linear carbon chain to which is attached a plurality of cationic groups such as, for example, amino and guaternary amino groups. Polymers which have been found to be effective usually have a molecular weight within the range of 500 to 5000. Examples of such polymers which are compatible with compounds of amphoteric metals are the polycondensates having a molecular weight of at least 1000 of epichlorohydrin and precondensates of polyalkylene polyamines and polyoxyalkylene glycol chlorides as disclosed in U.S. Pat. No. 3,251,882, the disclosure of which is incorporated herein by reference, and polyethylene polyamines as disclosed in U.S. Pat. No. 3,751,474, the disclosure of which is incorporated herein by reference. Other suitable polycationic linear polymers are condensation products of ammonia and ethylene dichloride and condensation products of ethylene diamine and ethylene dichloride and the quaternary salts thereof as disclosed in U.S. Pat. No. 3,372,129, the disclosure of which is incorporated herein by reference. Suitable polycationic linear polymers for the purpose of the invention are also obtained by the polymerization of polyethylene glycol and hexamethylenediamine. Good results are obtained with a condensation product of hexamethylene diamine, polyethylene glycol, epichlorhydrin and 1,4-dichloro-2-butene. Similar polycationic water dispersible polymers having a linear main carbon chain with a plurality of cationic groups attached thereto which are compatible with compounds of amphoteric metals can be employed for the purpose of the invention. Also, the linear polyamine polymers of low molecular weight disclosed in U.S. Pat. No. 3,468,818 may be used in the practice of the present invention, the disclosure of which is incorporated herein by reference.

The compounds of amphoteric metals which are employed for the purpose of the invention include, for example, zinc chloride, ferric chloride, lanthanum chloride, aluminum chloride, zinc nitrate, zinc sulfate and zinc oxide. Thus, the compounds of the amphoteric metals can be soluble or insoluble in water.

The polycationic polymer is blended with the compound of the amphoteric metal preferably in a weight ratio within the range of 0.2 to 3 parts by weight of said compound per part of the polycationic polymer.

Blends of amphoteric metal salts and polycationic polymers have heretofore been used in breaking oil-in-water emulsions and their effectiveness for this purpose may contribute to their effectiveness in the practice of the present invention. However, for the purpose of the present invention it is desirable to carry out the process by adjusting the pH of the water containing the blend of polycationic water dispersible polymer and amphoteric metal compound to a pH within the range of 7.5 to 10.5, preferably 9.0 to 10.5, for non-aqueous paints and 5.5 to 7.0 for water based paints. Control of pH to produce greater alkalinity is accomplished by adding any suitable alkaline material such as an alkali metal hydroxide, e.g., sodium hydroxide or potassium hydroxide. Usually it is preferable to employ sodium hydroxide because it is the least expensive. Other alkalis can be used but alkaline compounds that tend to form insoluble salts are less desirable. Control of pH to produce acidity is accomplished by adding an acid, e.g., sulfuric acid or hydrochloric acid.

The invention is applicable to the treatment of water sprays in paint or lacquer spray booths regardless of the type of paint or lacquer. Thus the paint or lacquer may be a water based paint or an oil based paint which can include acrylic resins, rubber latex type polymers, nitrocellulose, polyester resins, urea-formaldehyde resins, melamine resins, and/or polyurethane resins.

The quantity of the blend of amphoteric compound and polycationic water dispersible polymer added to the water can vary somewhat depending upon the water analysis and other factors but it is usually within the range of 100 parts per million (ppm) to 200 ppm. In some cases dosages as low as 25 ppm (polymer solids) were effective. The amounts should be sufficient to reduce the tackiness of paints and lacquers and thereby reduce the tendency of over-sprayed paints and lacquers to adhere to walls, ceilings and floors of spray booths and it should also be sufficient to condition paint and lacquer solids removed with the water so that they can be separated from the water by settling, filtration or in some other manner and the water returned for recirculation in the process.

In a process of this type it is usually customary to pump the water through conduits to the spray booth and the blend of electrolyte and polycationic polymer can be introduced into the water at any suitable point, preferably just ahead of or after the pump.

The invention will be illustrated but is not limited by the following examples in which the quantities are given in parts by weight unless otherwise indicated.

EXAMPLE I

The process of the invention was carried out in the spray paint booth of an automobile body plant using a system in which water was sprayed into the booth to remove over-sprayed paint solids, the suspension of paint solids in water was treated outside of the booth to separate the paint solids and the water was then recirculated through a pump to the paint booth. In this process water was recirculated at the conventional rate within the range of 3000 to 10,000 gallons per minute. The paint was a non-aqueous dispersion type (NAD).

Approximately 3 to 4 gallons per hour of a blend of zinc chloride and a polycationic polyelectrolyte containing approximately 2 parts by weight of zinc chloride per part of a polycationic polymer derived from epichlorohydrin, polyethylene glycol, hexamethylene diamine and 1,4-dichloro-2-butene (a polymer of a general type disclosed in U.S. Pat. 3,251,882) was added to the water at the pump used to pump the water into the spray booth for the purpose of washing the air and to remove over-sprayed paint solids after adding sufficient caustic soda to maintain a pH of 9.0 to 10.0 in the water. A suspension of paint solids in water was withdrawn from the spray booth and pumped to a settling tank where it formed a sludge. After this sludge had attained a minimum of about 8% solids it was pumped to a vacuum filter and the filtrate was recycled through the pump to the spray booth.

Corrosion tests and microbiological tests indicate that the treatment produces minimal corrosive effects and that there is little, if any, microbiological changes of an adverse nature.

It was also found to be desirable to condition the sludge in the settling tank by adding a small amount, for example, 100–200 ppm of a water dispersible coagulating type polymer such as, for example, a polyacrylamide or an acrylic acid-acrylamide polymer.

EXAMPLE II

A jar test method was devised to evaluate the effectiveness of different combinations of amphoteric metal compounds and polycationic polymers. In this method 2 liters of water were charged into a one gallon container and 5 cc of paint was added while stirring at high speed. This gave a synthetic paint waste containing approximately 2500 ppm of paint. Tests were run at different pH levels, with different types of paints, different additives and various dosages of additives. The main criteria was the tackiness of the treated paint with water clarify a secondary factor. Without any treatment, the paint would coat the inside of the test apparatus and would be difficult to clean. With proper treatment, the paint formed small non-tacky particles which would not adhere to any surface. The few specks on the side of the test vessels could be washed away with a stream of water. Also the specks could be handled and crushed without forming a sticky mass.

Using the foregoing test procedure four different classes of paint were evaluated namely, latexes, (water based paints); enamels (solvent based paints); non-aqueous dispersions (NAD), and lacquers. With an additive of the type disclosed in Example I on various solvent based paints at a pH of 9 to 10 and at dosages from 25 to 200 ppm where the weight ratio of paint to additive varied from 100:1 to 5:1 good results have been obtained. Similarly, good results were obtained at a pH of 9 to 10 and dosages of 50 to 200 ppm with ratios of paint to additive from 12.5:1 to 50:1 on non-aqueous dispersions of paint (NAD) using an additive of the type described in Example I. In a like manner, good results were obtained with an additive as described in Example I at pH of 9 and a dosage of 50 ppm with a weight ratio of paint to additive of 50:1 where the paint was an acrylic lacquer. On the other hand, with the additive of Example I where the paint was a latex paint, optimum results were obtained at a pH of 6.5 using a dosage of 200 to 250 ppm or a weight ratio of paint to additive of 10:1 to 12:1. At higher pH's of 9 to 10 the additive was effective at 500 ppm or a weight ratio of paint to additive of 5.1 but was ineffective at a dosage of 350 ppm or a weight ratio of paint to additive of 7:1.

Thus, these tests show that optimum detackification occurs when the pH is kept above at least 8 except with a latex paint where the optimum results were at pH between 6 and 7.

EXAMPLE III

Tests of the type described in Example II were carried out on an oil base primer (solvent based paint) using as the additive a blend of zinc oxide and a condensation product of ethylene dichloride and ethylene diamine prepared according to the general procedure given in U.S. Pat. No. 3,372,129, the weight ratio of zinc oxide to polymer being approximately 2:1. This additive was effective at a pH of 9 and dosages of 40 to 80 ppm. This additive was also effective at a dosage of 100 ppm at a pH of 9 on an enamel solvent based paint.

The complex of zinc oxide and ethylene dichloride-ethylene diamine polymer was also tested on a water based primer latex paint and was found to be effective at a dosage of 100 ppm and at a pH of 6.5. Only fair results were obtained at a pH of 10 even with a dosage of 250 ppm. On the water based paint 200 ppm of the additive of Example I was required at a pH of 6.5 to give similar results obtained with the complex of zinc oxide and ethylene dichloride-ethylene diamine polymer at a dosage of 100 ppm.

EXAMPLE IV

An acrylic lacquer when tested as in Example II, using the additive of Example I, was treated effectively at a pH of 9 and a dosage of 550 ppm to produce a non-tacky floc. At a pH of 6, 600 ppm of the same additive gave no floc.

In tests that were made to compare the practice of the present invention with conventional methods of treatment it was found that in a treatment of the water to the spray booth being used commercially where the run lasted for two weeks after which the booth was emptied and cleaned, the cleaning required 200 man days whereas a run of equal time carried out in accordance with the present process required 5 man days to clean the booth.

Constant monitoring of water quality and microbiological activity which was used to determine the effectiveness of the treatment demonstrated that the process of the present invention would control suspended solids and actually reduce the solids with time whereas a previously used commercial process caused the treated booth to saturate with solids, thus increasing the probability of booth deposits.

Spray booths treated in accordance with the present invention remained relatively clean and of low microbiological activity while spray booths treated by a previously commercial method were subject to high deposits and corrosion due to the high counts of corrosive and deposit-forming bacteria.

The invention is hereby claimed as follows:

1. In a process for controlling pollution and contamination in paint or lacquer spray booths in which water is used to wash the air in the spray booth to remove over-sprayed paints or lacquers and solids are removed from the water which is then recirculated for further use in washing the air in the spray booth, the improvement which comprises adding to said water a quantity of a blend of a compound of an amphoteric metal and a polycationic water dispersible polymer, said quantity being sufficient to reduce the tackiness of paints and lacquers and thereby reduce the tendency of over-sprayed paints and lacquers to adhere to walls, ceilings and floors of said spray booths, and said polymer also being effective to condition paint and lacquer solids removed with said water so that they can be separated from the water which is then returned for recirculation in the process.

2. A process as claimed in claim 1 in which the paint is a non-aqueous paint and the pH of said water containing said blend is adjusted to a pH within the range of 7.5 to 10.5.

3. A process as claimed in claim 1 in which the paint is a water based paint and the pH of said water containing said blend is adjusted to a pH within the range of 5.5 to 7.0.

4. A process as claimed in claim 1 in which said polymer has a linear chain containing carbon atoms to which are attached cationic groups selected from the group consisting of amino and quaternary amino groups.

5. A process as claimed in claim 1 in which said polymer is a condensation product of hexamethylene diamine, polyethlyene glycol, epichlorhydrin and 1,4-dichloro-2-butene.

6. A process as claimed in claim 1 in which said polymer is a condensation of ethlene dichloride and ethylene diamine.

7. A process as claimed in claim 1 in which said compound of said amphoteric metal is zinc chloride.

8. A process as claimed in claim 1 in which said compound of said amphoteric metal is zinc oxide.

9. A process as claimed in claim 1 in which said polymer has an average molecular weight within the range of 500 to 5000.

10. A process as claimed in claim 1 in which the weight ratio of said amphoteric metal compound to said polymer within the range of 0.2 to 3 parts by weight of said compound per part of said polymer.

* * * * *

UNITED STATES PATENT AND TRADEMARK OFFICE
CERTIFICATE OF CORRECTION

PATENT NO. : 3,990,869
DATED : November 9, 1976
INVENTOR(S) : STEVEN W. FORNEY

It is certified that error appears in the above-identified patent and that said Letters Patent are hereby corrected as shown below:

Column 2, line 63, "guaternary" should read --quaternary--.

Column 5, Example IV, line 3, "550" should read --50--.

Signed and Sealed this

First Day of March 1977

[SEAL]

Attest:

RUTH C. MASON
*Attesting Officer*

C. MARSHALL DANN
*Commissioner of Patents and Trademarks*